Oct. 27, 1959 — R. T. BURNETT — 2,910,144
COMBINATION SHOE AND DISK BRAKE
Filed Jan. 19, 1955 — 4 Sheets-Sheet 1
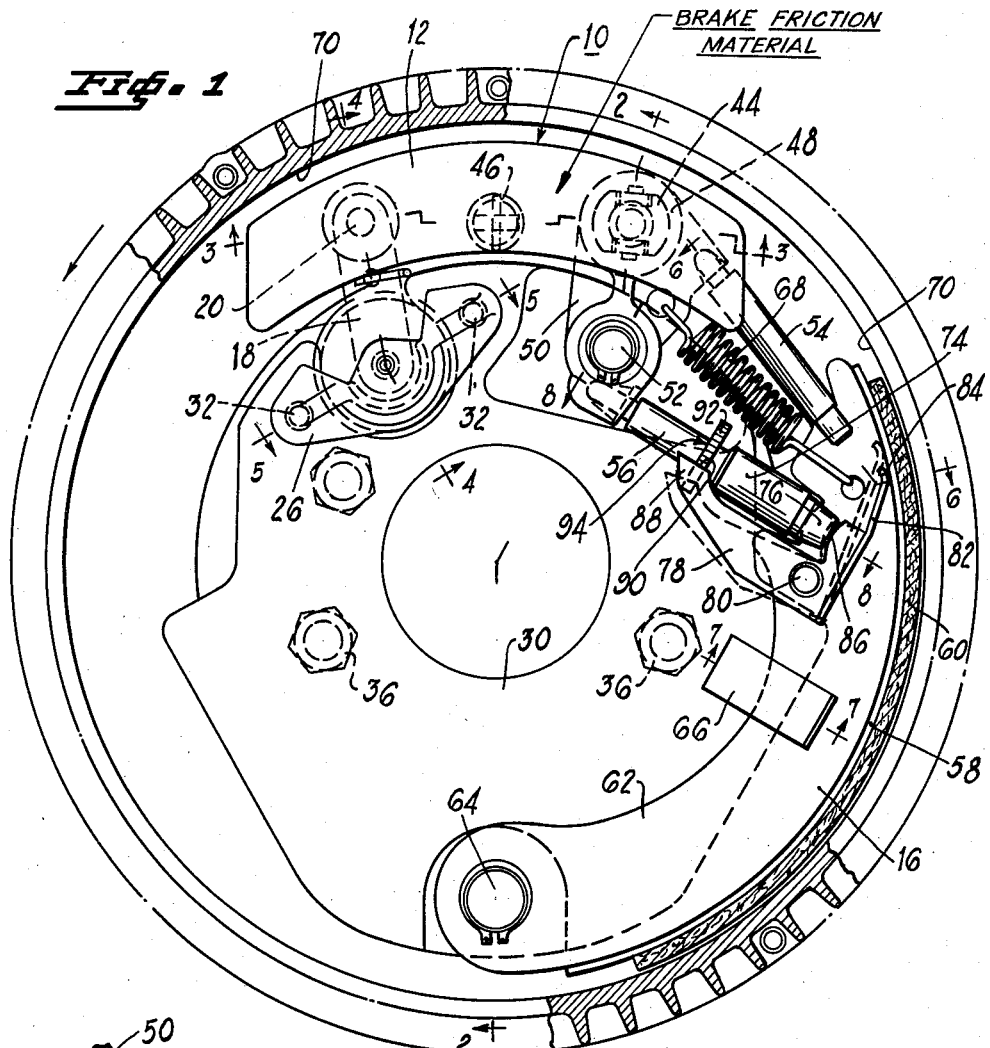
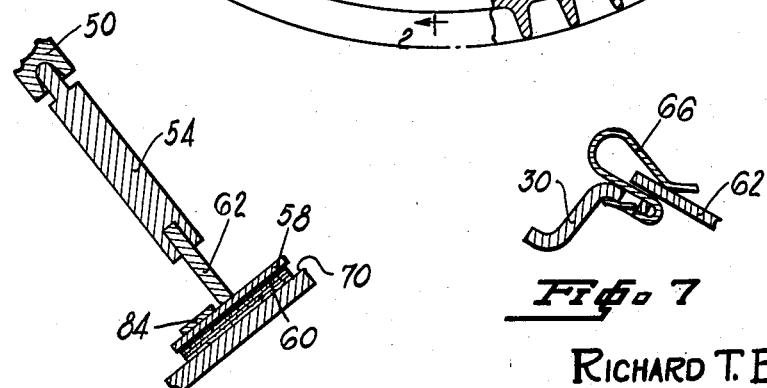
INVENTOR.
RICHARD T. BURNETT
BY John A. Young
ATTORNEY

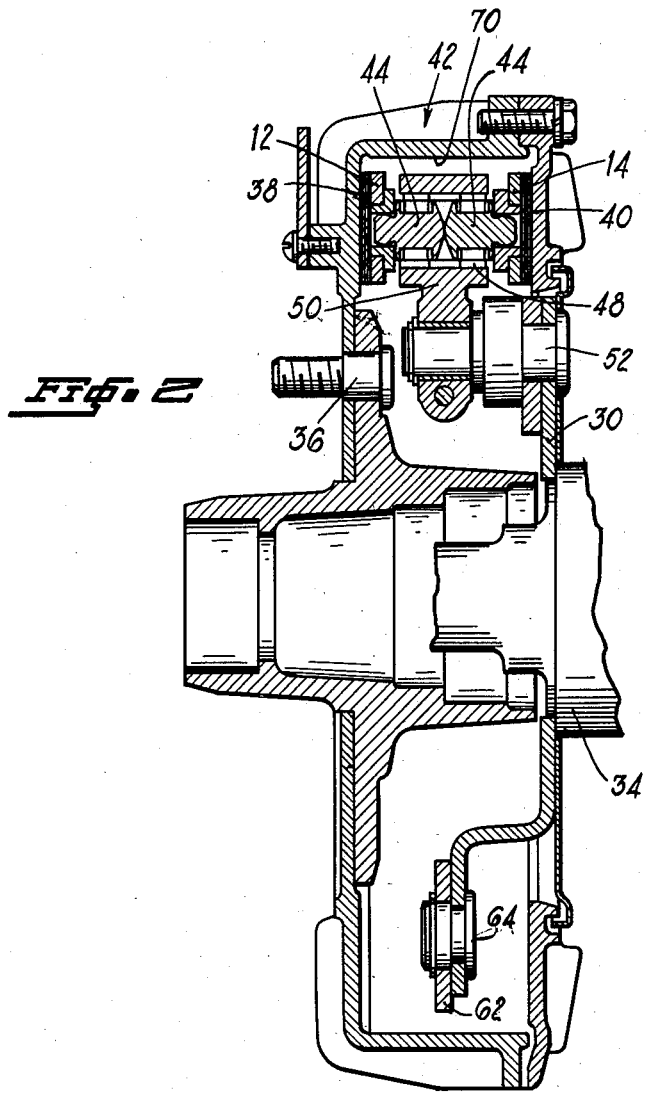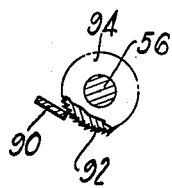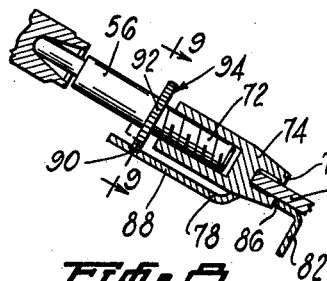

Oct. 27, 1959   R. T. BURNETT   2,910,144
COMBINATION SHOE AND DISK BRAKE
Filed Jan. 19, 1955   4 Sheets-Sheet 3

INVENTOR.
RICHARD T. BURNETT
BY
John A. Young
ATTORNEY

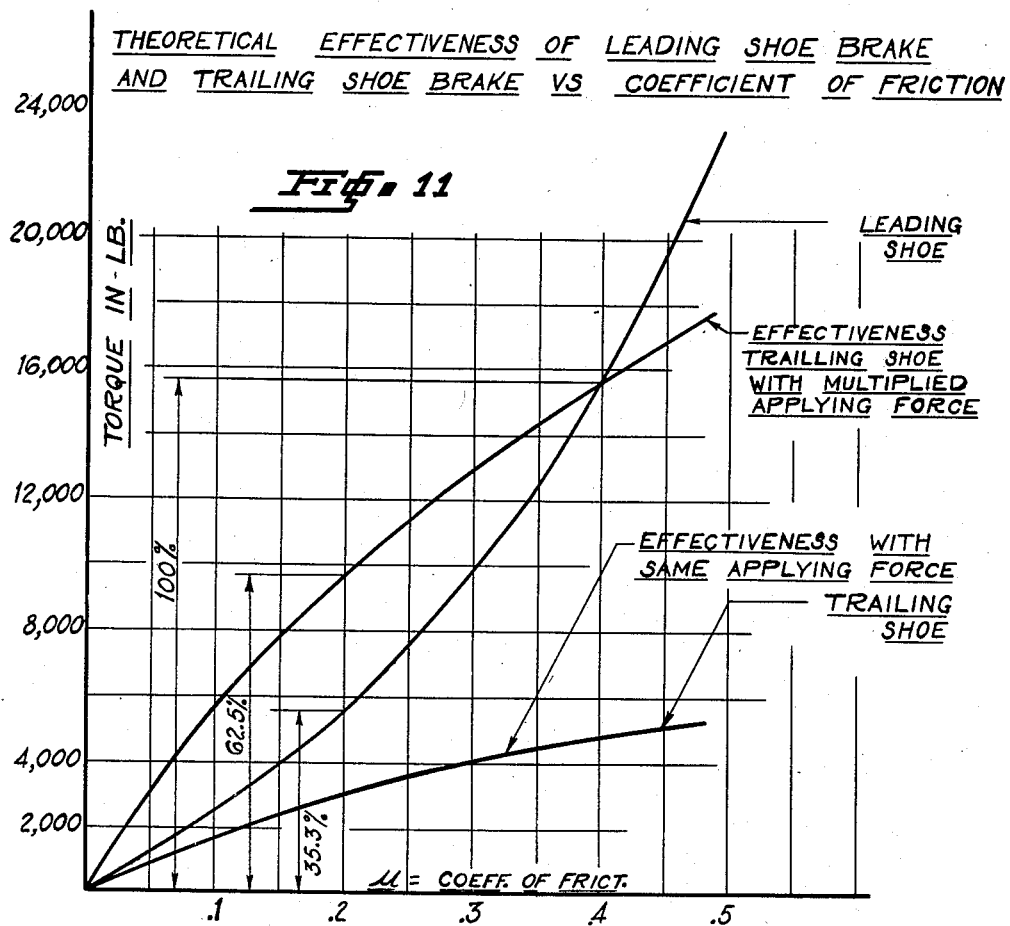
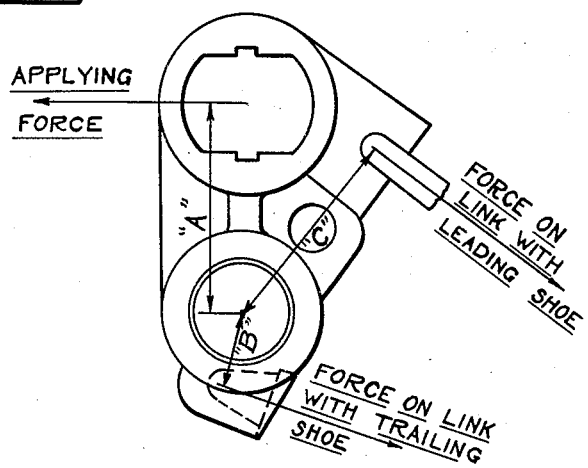

United States Patent Office 2,910,144
Patented Oct. 27, 1959

2,910,144

COMBINATION SHOE AND DISK BRAKE

Richard T. Burnett, South Bend, Ind., assignor to Bendix Aviation Corporation, South Bend, Ind., a corporation of Delaware Application January 19, 1955, Serial No. 482,827

6 Claims. (Cl. 188—70)

This invention relates to a brake in which there are provided distinct friction elements, the one axially applied and directly controlled by the operator, and the other radially applied and "servo" actuated by the axially-applied friction elements.

The braking art is constantly striving for ways to bring vehicle speed under closer control by the operator. To obtain closer vehicle speed control, it is necessary to provide the operator with some one or other measure by which he can gauge the effectiveness of the brake. This gauge has been, for the most part, the foot pedal pressure which he exerts. Unfortunately, the conditions which make for one value of brake effectiveness (at the start of the braking cycle) do not remain the same while the vehicle is decelerating, and so with a constant pedal pressure which the operator initially exerts, there can result an increasing effectiveness (called "wind-up") or decreasing effectiveness (called "fade") while the vehicle is being braked.

Ideally, the operator should be able to apply the brakes with a given pedal pressure and the brakes should then respond by decelerating the vehicle at a given deceleration rate which remains constant throughout all ranges of speed. In another brake function, the operator should be able to apply the brake while the vehicle is descending a hill, and by holding the same pedal pressure maintain a constant impedance on the vehicle.

The chief obstacle to realization of "ideal" brake performance is the effect of heat on the brake components. It is a primary object of this invention to approach the "ideal" brake performance by minimizing the effect of heat. In keeping with this object of the invention, I have attempted to obtain a cooler running brake to avoid undesirably high temperatures, and also to reduce loss of brake effectiveness from decreasing coefficient of friction of the lining.

In addition to this foregoing object, I intend to provide a brake which is substantially equally effective in either direction. Contained within this object is the feature that the operator may safely rely on the same effectiveness-pedal pressure ratio even when the direction of vehicle movement is reversed.

It is a further object of the invention that increased braking effectiveness can be reached at much lower pedal pressures so that a "trailing shoe" brake is possible at pedal pressures well within reasonable pedal travel. This means that a "trailing shoe" brake may be actuated to obtain satisfactory deceleration with moderate pedal pressures. The significance of the "trailing shoe" brake action will become more apparent as the description develops.

A further feature of the invention is that of providing structure which lends itself to automatic adjustment, the object being to reduce noise and maintain pedal reserve.

These objects and features of the invention as well as others will become more apparent as the description proceeds with reference to the accompanying drawings, wherein:

Figure 1 is a plan view of the brake showing the rotor in partial section;

Figure 2 is a section view taken on line 2—2 of Figure 1;

Figures 3, 4, 5, 6, 7 and 8 are detail section views taken on these respective lines in Figure 1;

Figure 9 is taken on line 9—9 of Figure 8;

Figure 10 is a detail view of the actuator also including a schematic force diagram; and Figure 11 is an effectiveness (in inch-pounds of torque) vs. coefficient of friction curve for both the trailing shoe and leading shoe brake.

Figure 3:
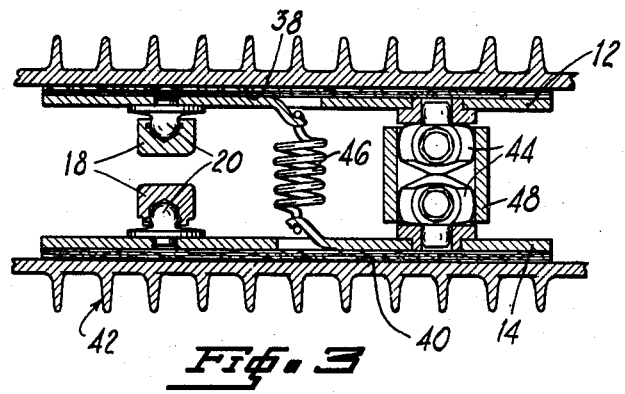

Referring to the drawings, the device 10 consists broadly of two oppositely-acting "disk" or "flat" shoe elements 12 and 14 and an "arcuate" shoe brake element 16.

The "flat" shoe elements 12 and 14 are actuated by articulated levers 18 having ball socket connections 20 therewith. The end of one of the levers is connected to a piston 21 in fluid motor 22 through a ball joint connection 24. The other lever bears at one end thereof against a fixed overlying abutment 26. A ball-joint connection 28 is provided between the end of the lever and the abutment 26.

Figure 5:
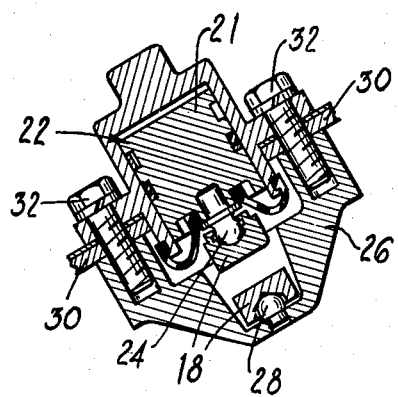

The plate-like abutment 26 is fastened to a support plate 30 by means of bolts or the like 32 which may be further adapted to clamp the fluid motor 22 to the support plate 30 (Fig. 5). The support plate in turn, may be fastened to a fixed part of the vehicle, such as an axle flange 34 by means of bolts 36 (Figs. 1, 2).

The "flat" shoe or disk elements 12 and 14 are applied against sides 38 and 40 of rotor 42. To assist in spreading the "flat" shoes, I provide two cams 44 which are located at one end of the "flat" shoes. For further details of the cam construction, operation, etc. reference may be made to my copending application Serial No. 486,184, filed February 4, 1955, now Patent No. 2,849,088, issued August 26, 1958.

A resilient return spring 46 is fastened between the disk elements and exerts retracting force thereon, disengaging them from frictional engagement with sides 38 and 40 of the rotor 42. The disk elements are connected to a lever 50 by means of the cams 44 which are mounted in a bearing 48 of the lever 50.

The lever 50 is pivoted on an anchor 52 (Figs. 1, 2). The lever is caused to swing on the anchor 52 by circumferential movement of the "flat" shoes 12 and 14 acting through the cams 44 and bearing 48. On one side of the pivot 52 for the lever 50 is a strut 54 and on the other side a second strut 56. The struts 54 and 56 are so located that force is transmitted from the "flat" shoes to the arcuate shoe 16.

Arcuate shoe 16 consists of a rim 58 having lining 60 and a transverse strengthening web 62. The arcuate shoe is pivotally fastened to an anchor 64 which is located diametrically opposite the "flat" shoes 12 and 14.

The support plate is irregularly surfaced so that a portion extends laterally to engage the underside of the web 62 of the arcuate shoe 16 (Figure 7). A hold-down device 66 is received in the support plate 30 and has one leg bearing against web 62 of the arcuate shoe 16 to hold it against the support member 30.

A return spring 68 is fastened between the lever 50 and arcuate shoe 16 to disengage lining 60 from cylindrical surface 70 of the rotor. The return spring 68 holds the shoe against the struts 54 and 56 which determine the retracted position for the arcuate shoe 16 when the brake is released.

The strut 56 is extensible to automatically adjust the shoe 16. The strut 56 (see Figures 8 and 9) has a threaded portion 72 and a nut 74 screwed onto the threaded portion 72. The nut 74 has a bifurcated end 76 which embraces web 62 to prevent turning of the nut 74.

A resilient spring steel member 78 is turnably mounted on the arcuate shoe by means of a pin 80. The spring steel member has one leg 82 which bears at end 84 against the rim 58 of shoe 16. End 76 of nut 74 pushes against leg 82 at point 96 (Figs. 1, 8) thus bowing the leg 82 as indicated in Figure 1. The resilient spring steel member 78, has a second leg 88 provided with a tooth 90 that engages serrations 92 on a transverse wheel 94. The transverse wheel is rigidly fixed to strut 56.

Further reference should be made to my copending applications wherein the following details are described more fully: the rotor 42, application No. 434,846, filed June 7, 1954, now abandoned; applying levers 18 and fluid motor 22, application No. 433,609, filed June 1, 1954; "disk" or flat shoes used to apply an arcuate shoe element, application No. 324,167, filed December 5, 1952, now abandoned.

Figure 4:
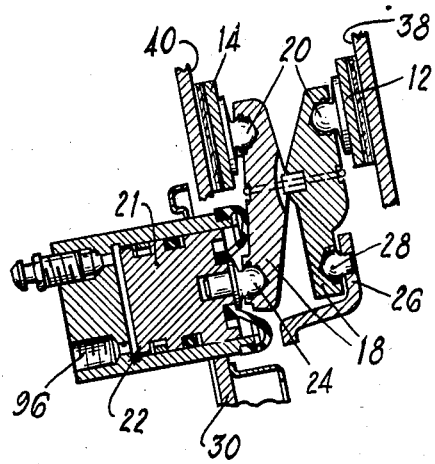

When the brake is applied, pressure is developed in a master cylinder (not shown) and is transmitted through an inlet port 96 (Fig. 4) to actuate the fluid motor 22. Piston 21 is moved toward the abutment 26 (Fig. 4) and the levers 18 are thus rocked together on their articulated surfaces located approximately midway between the ends thereof. When actuated, the levers 18 force apart the disk or "flat" shoes 12 and 14 forcibly engaging them with surfaces 38 and 40 of the rotor.

Assuming that the vehicle is traveling forwardly, the rotor is moving in a counterclockwise direction (Fig. 1). When the "flat" shoes 12 and 14 engage the sides of the rotor, they are caused to shift circumferentially in the same direction as rotor movement; the levers 18 swivel on ball joint connections 24 and 28 as the "flat" shoes describe this movement.

The camming devices 44 assist in spreading the "flat" shoes 12 and 14. The camming devices further serve as transmitting elements through which the circumferential shifting of the "flat" shoes exert a turning force. Counterclockwise circumferential shifting of the flat shoes produces counterclockwise turning of the lever 50 which in turn acts through strut 56 to produce clockwise pivotal actuation of arcuate shoe 16. The arcuate friction surface 60 of the shoe 16 is brought into forcible engagement with surface 70 of the rotor 42.

The actuating force exerted by the "flat" shoes 12 and 14 on the arcuate shoe 16 is influenced by the lever ratio of lever 50. Referring to Figure 10, it will be seen that the force developed by the "flat" shoes has a lever arm, the length of which is represented by distance. A. The lever arm of the force transmitted to the arcuate shoe through link 56, is represented by distance B. The lever ratio of the force which is developed by the "flat" shoes, and is transmitted to the arcuate shoe may be expressed mathematically as $A/B$. It will be noted that in this direction of vehicle braking, the arcuate shoe 12 acts as a "trailing" shoe brake; that is, the shoe pivots oppositely to the direction of movement of the rotor, with the result that the wiping action of the rotor opposes the applying force. The brake shoe is "de-energizing" as well as "trailing." The drum "reaction" force which is developed opposes and hence reduces the actuating force on the arcuate shoe at the input end thereof.

Because the arcuate shoe 16 is a "trailing" shoe, the effect of high temperatures on brake operation is materially reduced. To illustrate, refer to Figure 11 where torque in inch-pounds is plotted vs. coefficient of friction for both a two-leading shoe and a two-trailing shoe brake. It will first be noted that one of the effects of increasing the temperature, is to reduce the coefficient of friction. Assume for example that the coefficient of friction of the lining decreases from 0.5 to 0.4. During this decrease in the coefficient of friction, the torque for a two-leading shoe brake decreases 33%, whereas the two trailing shoe brake decreases only 11%. Since the torque is a measure of the effectiveness of the brake, it can be thus demonstrated that the trailing shoe brake is less susceptible to "fade" as a function of temperature. Hence the trailing shoe brake is more stable than the leading shoe brake. A further feature to note, is that trailing shoe braking is provided during forward vehicle movement when speeds are elevated and the temperatures generated are quite high; it follows that stability is a greater problem with braking in forward movement of the vehicle.

One of the hindrances to adoption of trailing shoe braking has been the necessarily high order of input actuating force. This is no longer a serious obstacle because input force is supplied by the "flat" shoes 12 and 14 which develop a high order of input force at low pedal pressures. Also because of the lever arrangement it has been possible to multiply the input actuating force according to lever ratio $A/B$. Obviously, any preferred lever ratio may be supplied. By the simple expediency of increasing the lever ratio, greater applying effort is exerted on the "trailing" arcuate shoe even though the operator's pedal pressure remains constant.

When the vehicle is traveling in reverse, the rotor is turning clockwise; the "flat" shoes produce clockwise turning of lever 50. When the lever 50 turns clockwise on anchor 52, the "flat" shoes exert force on the arcuate shoe 16 through link 54. The lever arm of the input force exerted by the "flat" shoes is represented by the distance A in Figure 10. The lever arm of the output force of the arm acting on link 54, is represented by the distance C. Note that the lever ratio $A/C$ is much less than the lever ratio $A/B$ in forward braking. This is compensated for by the fact that the "arcuate" shoe is now a leading shoe and hence develops greater effectiveness with lower input force.

The two different lever ratios, and the difference in effectiveness of the arcuate shoes in each direction, are so combined, that the brake is about equally effective in either direction. The net result is that the operator has about the same pedal "feel" in both forward and reverse.

It will be noted that the increased susceptibility of a "leading" shoe to fade, with high temperatures, is minimized because of lower vehicle speeds while braking in reverse. A further feature of the arcuate shoe is its adjustability during reverse braking. The end 76 of strut 56 moves away from contact with the leg 82 of adjustor 78. The leg 82 straightens and this turns the leg 88 of the adjustor counter-clockwise on pin 80, causing the tooth 90 to engage a different serration on the wheel 94. This intermediate position of the adjustor is shown in dotted lines in Figure 1. When the brake is released, the adjustor again assumes the position shown in full lines in Figure 1, and in doing so, causes the wheel 94 to rotate thus extending the link 56. When the link 56 is extended, the shoe pivots clockwise on anchor 64 and the overall result is that the arcuate shoe is adjusted closer to the rotor to compensate for wear of the lining 60.

When the brake is released, spring 68 pivots the shoe 16 until it contacts link 56; the spring force can also cause pivoting of lever 50 keeping the strut 54 in contact with the lever 50 and the shoe 16. Turning of both the shoe and lever is stopped when the links 54 and 56 are contacted at both ends. The links form a trapezoid with the shoe and lever (Fig. 1).

From a consideration of the foregoing description it will be apparent that the principles of the invention are susceptible of numerous applications. The example embodiment is illustrative of the invention and is not intended to be restrictive thereof. It will be understood that the numerous adaptations of the invention which embody the principles thereof are intended to be covered within the scope of the following claims.

I claim:

1. A kinetic-energy-absorbing device comprising oppositely-acting axially movable first friction elements, means for providing circumferential movement of said friction elements, applying means operatively connected to said first friction elements for exerting axially directed force on said first elements to produce actuation thereof, means constructed and arranged to receive the torque resulting from application of said first friction elements, a lever which is fulcrumed on said means for receiving the anchoring load, an arcuate friction element pivotally secured to said means for receiving the anchoring load independently of said first friction elements, means for operatively connecting said first friction elements with said lever whereby circumferential shifting of said first friction elements produces turning of said lever, a link fastened between said lever and arcuate friction element on one side of the fulcrum thereof, a second link fastened between said lever and arcuate friction element on the other side of the fulcrum, said links defining the normally retracted position of said arcuate friction element, resilient means fastened between said lever and arcuate friction element to hold said arcuate friction element in a normally retracted position, and automatic adjusting means which extends one of said links to position the arcuate friction element responsively to wear of said arcuate friction element.

2. A linkage for applying an arcuate brake shoe comprising a pivoted member, thrust elements located on opposite sides of the pivot of said member and movable thereby in opposite directions by said pivoted member, means for transmitting force to said pivoted member to cause it to turn in either direction, means for operatively connecting thrust elements with an arcuate brake shoe to exert applying effort thereon and to further limit extent of retraction thereof, one of said thrust elements being automatically extensible to adjustably position the arcuate brake shoe, and means for yieldably holding the arcuate brake shoe against said links to maintain retraction thereof when the brake is released.

3. In a brake, a kinetic energy absorbing device adapted for use with a rotor, said device comprising a first circumferentially shiftable friction element, a pivoted arcuate second friction element which pivots oppositely to rotor rotation during braking with forward vehicle movement, means for transmitting applying force between said first and second friction elements, said means comprising a pair of links of unequal mechanical advantage, means for actuating the link of greater mechanical advantage to exert greater applying effort on said second friction element during breaking of forward vehicle movement and means for actuating the link of lesser mechanical advantage to apply a lesser braking effort on said second friction element during braking of reversed vehicle movement whereby the brake is substantially equally effective in both forward and reverse directions of vehicle movement.

4. In a brake having first and second friction elements, a pivot, a lever connected to said first element and being rotatably mounted on said pivot, force transmitting means connected to said lever on opposite sides of said pivot and at unequal distance from said pivot, said force transmitting means being connected to said second element whereby said second element is applied by rotation of said lever in either direction, and means urging said second element in a retracting direction into engagement with at least one of said force transmitting means.

5. A kinetic energy absorbing device comprising two oppositely acting disk friction elements mounted for circumferential movement, an arcuate friction element which is energizing during braking in one direction and de-energizing during braking in the opposite direction, a pivoted lever connected to at least one of said disk elements for rotation in response to circumferential movement of said disk elements, and first and second force transmitting members connected to said lever on opposite sides of the pivot and being connected to said arcuate element, said first member being connected to said lever closer to said pivot than said second member whereby greater effort is applied to said arcuate element when it is de-energizing than when it is energizing so that said device is substantially equally effective in either direction of braking.

6. A kinetic energy absorbing device having a rotor, said device comprising a first friction element mounted for axial and circumferential movement, means for urging said first element axially into engagement with said rotor, said first element being moved circumferentially by the reaction of engagement of said element with said rotor, a pivotally mounted arcuate friction element, a pivotally mounted lever operatively connected to said first element and having first and second lever arms disposed on opposite sides of the pivot, said second lever arm being longer than said first lever arm, means respectively connecting said first and second lever arms to said arcuate element whereby rotation of said lever during a forward moving vehicle application applies a greater force to said arcuate element than rotation of said lever during reverse moving vehicle application.

References Cited in the file of this patent

UNITED STATES PATENTS

| | | |
|---|---|---|
| 1,542,135 | Hirvonen | June 16, 1925 |
| 1,716,666 | Renaux | June 11, 1929 |
| 1,837,573 | Mox | Dec. 22, 1931 |
| 1,874,131 | Smith | Aug. 30, 1932 |
| 1,875,065 | Lyman | Aug. 30, 1932 |
| 1,876,265 | Tucker et al. | Sept. 6, 1932 |
| 1,957,668 | Renaux | May 8, 1934 |
| 2,065,382 | Levy | Dec. 22, 1936 |
| 2,070,470 | Clench | Feb. 9, 1937 |
| 2,108,467 | Backstrom | Feb. 15, 1938 |
| 2,174,398 | Farmer | Sept. 26, 1939 |
| 2,751,046 | Tack | June 19, 1956 |

FOREIGN PATENTS

| | | |
|---|---|---|
| 450,770 | Great Britain | July 23, 1936 |